June 2, 1959 R. N. SUSSEX 2,888,702
WINDSHIELD WIPER BLADE ASSEMBLY
Filed July 22, 1955
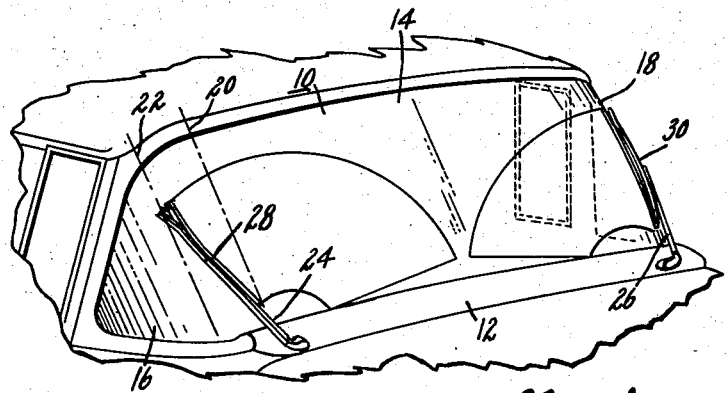
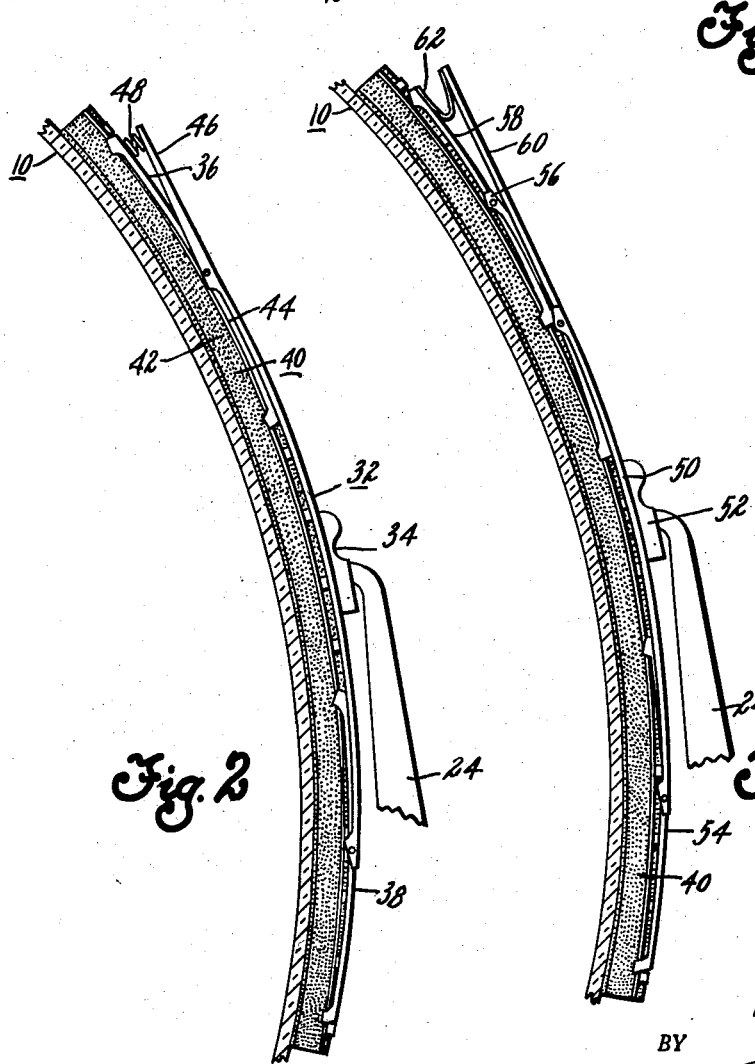
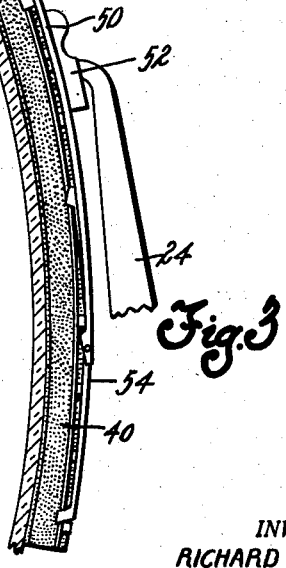
INVENTOR.
RICHARD N. SUSSEX
BY
HIS ATTORNEY

2,888,702

WINDSHIELD WIPER BLADE ASSEMBLY

Richard N. Sussex, Lansing, Mich., assignor to General Motors Corporation, Detroit, Mich., a corporation of Delaware Application July 22, 1955, Serial No. 523,764

8 Claims. (Cl. 15—245)

This invention pertains to windshield cleaning apparatus, and particularly to improved flexible blade assemblies for cleaning curved vehicular transparencies.

Conventional curved wiper blade assemblies usually include a primary yoke, or holder, a plurality of secondary pressure distributing members, a flexible backing strip and a rubber wiping element. The rubber wiping element is carried by the backing strip, and in some cases is freely tiltable relative thereto. The secondary pressure distributing members are movably connected at longitudinally spaced points to the backing strip, and operatively connected to the primary yoke, or holder. Wiping pressure is applied to the blade assembly through the holder from a wiper arm which is detachably connected thereto. Ordinarily, conventional wiper blade assemblies do not conform to the severely curved portions of modern wrap-around windshields due to the fact that the tip portion of the blade does not contact the windshield adjacent the outboard stroke end. The present invention relates to improved wiper blade assemblies, and is particularly directed to auxiliary pressure applying means for the outer ends thereof. Accordingly, among my objects are the provisions of a flexible wiper blade assembly including auxiliary pressure applying means for the outer end thereof; and the further provision of a flexible wiper blade assembly including blade carried resilient means for applying additional pressure to the outer end thereof.

The aforementioned and other objects are accomplished in the present invention by extending the outer end of the holder, and interposing a spring between this extension and the outer secondary pressure distributing member adjacent the tip of the blade. In this manner, additional pressure is applied to the tip of the blade thereby enabling the blade to conform to surfaces of greater curvature. Specifically, the improved blade assembly of this invention enables the wiping stroke to be increased approximately two or three inches adjacent the outboard stroke end by maintaining the outer end of the blade in contact with the windshield.

In one embodiment, the auxiliary pressure applying means comprise a coil spring interposed between the holder extension and the outer secondary pressure applying member. In a second embodiment, the auxiliary pressure applying means are constituted by a flat spring. Moreover, the auxiliary pressure applying means can be incorporated in any of the several types of conventional wiper blade assemblies currently used, and the specific arrangements disclosed herein are only exemplary, and are not to be construed as limitations.

Further objects and advantages of the present invention will be apparent from the following description, reference being had to the accompanying drawing wherein preferred embodiments of the present invention are clearly shown.

In the drawing:

Fig. 1 is a fragmentary view, in elevation, of a vehicle equipped with the improved wiper blade assemblies of this invention.

Fig. 2 is a fragmentary view, partly in section and partly in elevation, of one embodiment of the improved wiper blade assembly.

Fig. 3 is a fragmentary view, partly in section and partly in elevation, of a second embodiment of an improved wiper blade assembly.

With particular reference to Fig. 1, a vehicle is shown having a wrap-around windshield 10 and a cowl 12. The wrap-around windshield 10 includes a frontal portion 14 and side portions 16 and 18, which are disposed in spaced parallel planes, and, hence, the frontal portion 14 and the side portions 16 and 18 are joined by severely curved sections. In particular, it has been noted that conventional wiper blade assemblies do not effectively clean the severely curved sections, as indicated between lines 20 and 22 due to the fact that the outer portion of the blade does not conform to this severely curved section.

In accordance with conventional practice, the windshield cleaning mechanism includes a pair of spaced arms 24, 26, the inner sections of which are drivingly connected with a pair of spaced transmission shafts, not shown, and the outer sections of which are detachably connected with flexible wiper blade assemblies 28 and 30. The wiper arms 24 and 26 are actuated simultaneously from a single motor, not shown, and have imparted thereto asymmetrical movement, as indicated in Fig. 1. In order to increase the stroke of the wiper blades adjacent the outboard stroke end, and, in particular, to effectively clean the windshield section between lines 20 and 22, I propose to modify conventional wiper blade assemblies by incorporating therein an auxiliary pressure applying means, which urge the outer section of the flexible wiper blades into conformance with the severely curved windshield sections and thereby increase the cleaning stroke of each wiper blade by approximately two and three inches between lines 20 and 22.

With particular reference to Fig. 2, one embodiment of my invention is depicated wherein a blade of the type disclosed in the Anderson Patent 2,596,063 is employed. This particular blade assembly comprises a primary yoke, or holder, 32 having arm attaching means 34. Opposite ends of the primary yoke 32 are pivotally connected to the intermediate portion of a pair of secondary yokes 36 and 38. Opposite ends of the secondary yokes, or secondary pressure distributing members, are movably connected to a flexible squeegee unit indicated generally by the numeral 40, at longitudinally spaced points. The squeegee unit 40 may be of conventional construction and, thus, includes a flexible rubber wiping element 42, which is carried by a flexible metallic backing strip 44, the backing strip 44 permitting the squeegee unit to flex freely in a plane normal to the windshield while preventing flexure thereof in a plane parallel to the windshield. In this embodiment, the outer end of the primary yoke is extended, as indicated by numeral 46, the outer end of the extension being located above the outer end of the outer secondary yoke 36. In this embodiment, the auxiliary pressure applying means comprise a coil spring 48 interposed between the outer end of the extension 46 and the outer end of the secondary yoke 36 so as to normally deform the blade assembly into a curvilinear shape to enable the blade assembly to effectively wipe surfaces of greater curvature than can be wiped by conventional blade assemblies.

With particular reference to Fig. 3, the second embodiment of the present invention is disclosed in conjunction with a different type of wiper blade assembly comprising a primary yoke, or holder, 50 having arm attaching means 52. The inner end of the primary yoke 50 is connected to the intermediate portion of a secondary yoke 54, opposite ends of which are connected to the squeegee unit 40. The outer end of the primary yoke 50 is connected to a member 56, the inner end of which is connected to the squeegee unit and the outer end of which is fulcrumed on a secondary yoke 58. The member 56 thus constitutes a third class lever since the pressure from arm 24 is applied between the fulcrum and the load. In this embodiment, the primary yoke 50 includes an extension 60, which terminates in alignment with the outer end of the secondary yoke 58. The auxiliary pressure applying means, in this instance, are constituted by a V-shaped flat spring 62, which is interposed between the extension 60 and the outer end of secondary yoke 58.

While only two different types of blade assemblies incorporating auxiliary pressure applying means for enabling these blade assemblies to conform to surfaces of greater curvature, are disclosed, it is to be understood that the auxiliary pressure applying means of this invention can be incorporated in any type of flexible blade assembly so as to improve its ability to clean severely curved surfaces. It should be noted that the auxiliary pressure applying means normally deform the blade assembly into a curvilinear shape, and, in effect, modify the pressure distribution from the arm as applied to the secondary pressure distributing members through the primary yoke, or holder. It has only been found necessary to incorporate auxiliary pressure applying means at the outer end of the blade assembly, since it is only this portion of the blade assembly that traverses severely curved surfaces.

While the embodiments of the present invention as herein disclosed, constitute preferred forms, it is to be understood that other forms might be adopted.

What is claimed is as follows:

1. A flexible wiper blade assembly for use with a wiper arm including, a holder having arm attaching means arranged to receive arm pressure, a plurality of secondary pressure distributing members pivotally connected to said holder, a flexible squeegee unit connected at spaced points to said secondary pressure distributing members including points adjacent the ends of said squeegee unit, said holder having an extension terminating adjacent the outer end of the blade assembly, and resilient means interposed between the outer end of said holder extension and the outermost secondary pressure distributing member connected to the squeegee unit adjacent said outer end of the blade assembly for applying deforming pressure to the outer portion of the squeegee unit.

2. A flexible wiper blade assembly for use with a wiper arm including, a flexible squeegee unit, a holder having arm attaching means for receiving arm pressure, a plurality of secondary pressure distributing members pivotally connected to said holder, said secondary pressure distributing members being pivotally connected to said squeegee unit at longitudinally spaced apart points including points adjacent the ends of said squeegee unit, said holder having an extension terminating adjacent the outer end of the blade assembly, and resilient means interposed between the outer end of said holder extension and the outermost secondary pressure distributing member connected to said squeegee unit adjacent said outer end of the blade assembly for applying deforming pressure to the outer portion of the squeegee unit.

3. A flexible wiper blade assembly for use with a wiper arm including, a flexible squeegee unit, a holder having arm attaching means for receiving arm pressure, at least two secondary pressure distributing members pivotally connected to said holder and connected to said squeegee unit at longitudinally spaced apart points including points adjacent the ends of said squeegee unit, said holder having an extension terminating adjacent the outer end of the blade assembly, and resilient means interposed between the outer end of said holder extension and the outermost secondary pressure distributing member connected to said squeegee unit adjacent said outer end of the blade assembly for applying deforming pressure to the outer portion of the squeegee unit.

4. A flexible wiper blade assembly for use with a wiper arm including, a flexible squeegee unit, a holder having arm attaching means for receiving arm pressure, at least two secondary pressure distributing members movably carried by said holder and connected to said squeegee unit at longitudinally spaced apart points, one of said points of connection between one pressure distributing member and said squeegee unit being adjacent the outer end of said squeegee unit, said holder having an extension disposed above said one pressure distributing member, said holder extension terminating adjacent the outer end of the squeegee unit, and resilient means interposed between the outer end of said holder extension and said one pressure distributing member for applying deforming pressure to the outer end of the squeegee unit.

5. The blade assembly set forth in claim 4 wherein said resilient means comprises a coil spring.

6. The blade assembly set forth in claim 4 wherein said resilient means comprises a flat spring.

7. A flexible wiper blade assembly including, a flexible squeegee unit, a holder, a plurality of secondary pressure distributing members pivotally connected to the holder, said secondary pressure distributing members being connected to said squeegee unit at longitudinally spaced apart points including points adjacent the ends of said squeegee unit, said holder having an extension on one end thereof terminating adjacent one end of the blade assembly, and resilient means interposed between the end of said holder extension and the secondary pressure distributing member connected to said squeegee unit adjacent said one end of the blade assembly for applying deforming pressure to one end of the squeegee unit.

8. A flexible blade assembly including, a flexible squeegee unit, a holder, at least two secondary pressure distributing members pivotally connected to said holder and connected to said squeegee unit at longitudinally spaced apart points including points adjacent the ends of said squeegee unit, said holder having an extension terminating adjacent one end of the blade assembly, and resilient means interposed between the ends of said holder extension and the secondary pressure distributiong member connected to said squeegee unit adjacent said one end of the blade assembly for applying deforming pressure to one end portion of the squeegee unit.

References Cited in the file of this patent

UNITED STATES PATENTS 2,706,291    Rappl _____ Apr. 12, 1955

FOREIGN PATENTS 1,033,521    France _____ Apr. 1, 1953